United States Patent [19]

Schwarz

[11] Patent Number: 4,593,571

[45] Date of Patent: Jun. 10, 1986

[54] LINEAR ACTUATOR

[76] Inventor: John F. Schwarz, 1125 Saunders Crescent, Ann Arbor, Mich. 48103

[21] Appl. No.: 681,591

[22] Filed: Dec. 14, 1984

[51] Int. Cl.⁴ .............................................. F16H 31/00
[52] U.S. Cl. ...................................... 74/89.2; 74/111; 74/164; 74/165
[58] Field of Search ................ 74/37, 89, 89.2, 89.21, 74/89.22, 111, 162–166

[56] References Cited

U.S. PATENT DOCUMENTS

| | | | |
|---|---|---|---|
| 272,811 | 2/1883 | Wetmore | 74/162 |
| 2,894,403 | 7/1959 | Tomko | 74/164 |
| 3,060,753 | 10/1962 | Conviser | 74/164 |
| 3,804,370 | 4/1974 | Woodard | 74/89.22 |
| 3,864,983 | 2/1975 | Jacobsen | 74/89 |
| 4,060,149 | 11/1977 | Henley | 74/89.2 |
| 4,085,625 | 4/1978 | Jung | 74/89.22 |
| 4,272,997 | 6/1981 | Groth | 74/89.22 |
| 4,351,197 | 9/1982 | Carson | 74/89.22 |

FOREIGN PATENT DOCUMENTS 627943  8/1949  United Kingdom .................. 74/111

*Primary Examiner*—Lawrence J. Staab
*Attorney, Agent, or Firm*—Hauke & Patalidis

[57] ABSTRACT

An apparatus and method for displacing a linear output member by wrapping at least a pair of flexible strands around the periphery of the linear member. The flexible strands are each attached at each end to spaced-apart rotatable members. Rotation of the rotatable members in opposite direction causes engagement of the flexible strands with the linear member as a wrap around the periphery of the linear member. After a grip is effected on the linear member, rotation of the rotatable members in the same direction causes the linear member to be linearly displaced.

11 Claims, 7 Drawing Figures

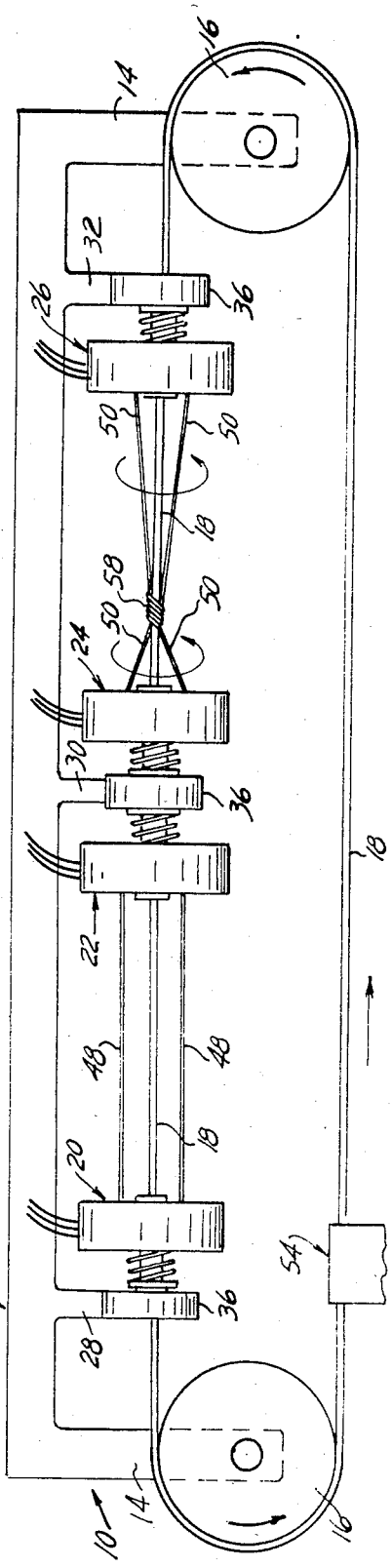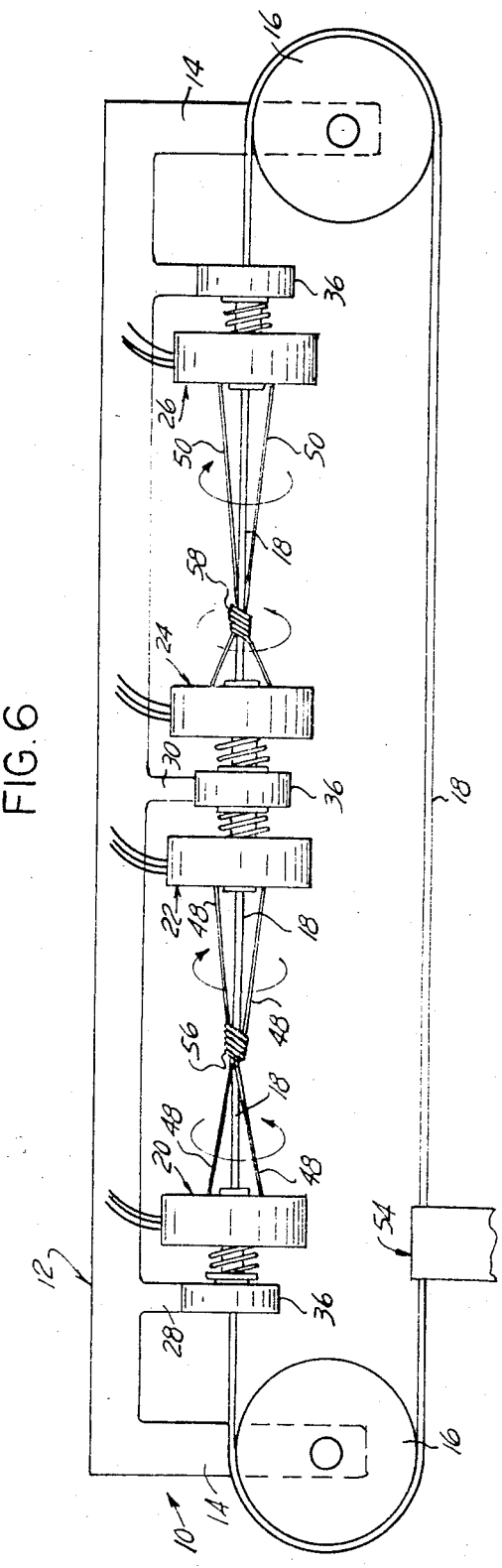

LINEAR ACTUATOR

BACKGROUND OF THE INVENTION

The present invention relates to linear actuators in general, and more particularly to an apparatus for linearly displacing an output member in the form of a rope, cable or rod by means of a rotary prime mover, the coupling between the rotary prime mover and the output member being effected by flexible filamentary elements, such as small flexible cables or strings, being wrapped around the output member and applying a grip on the output member with a pull directed in an appropriate direction.

It is often desired to apply linear motion to an output member such as to displace the output member to an accurate position with force amplification from a prime mover to the output member.

The output member may be in the form of a rod which is reciprocated such as to reciprocate a utilization device, a slide for example, or it may be a closed loop member such as a conveyor belt or the like. The prime mover often is in the form of an electric motor, or a plurality of electric motors having a rotatably driven output shaft with the result that a rotary to linear motion transformer and force amplifier is required. The rotary to linear motion and force amplifier transformer means consists generally of a gear and rack structure, or similar arrangement.

SUMMARY OF THE INVENTION

The principal object of the present invention is to transform rotary motion of an input member into linear motion of an output member by way of a coupling devoid of gears, belt and pulley drive or clutching mechanisms and the like. A particular advantage of the invention is to achieve a rotary to linear motion converter by simple means providing any suitable ratio of displacement, without excessive backlash and with appropriate force amplification.

The many objects and advantages of the present invention will become apparent to those skilled in the art when the following description of the best mode contemplated at the present for practicing the invention is read in conjunction with the accompanying drawings wherein:

BRIEF DESCRIPTION OF THE DRAWINGS

FIGS. 2-7 are views similar to FIG. 1, but showing consecutive steps in the operation of the linear actuator of the invention.

DETAILED DESCRIPTION OF THE PREFERRED EMBODIMENT

Figure 1:
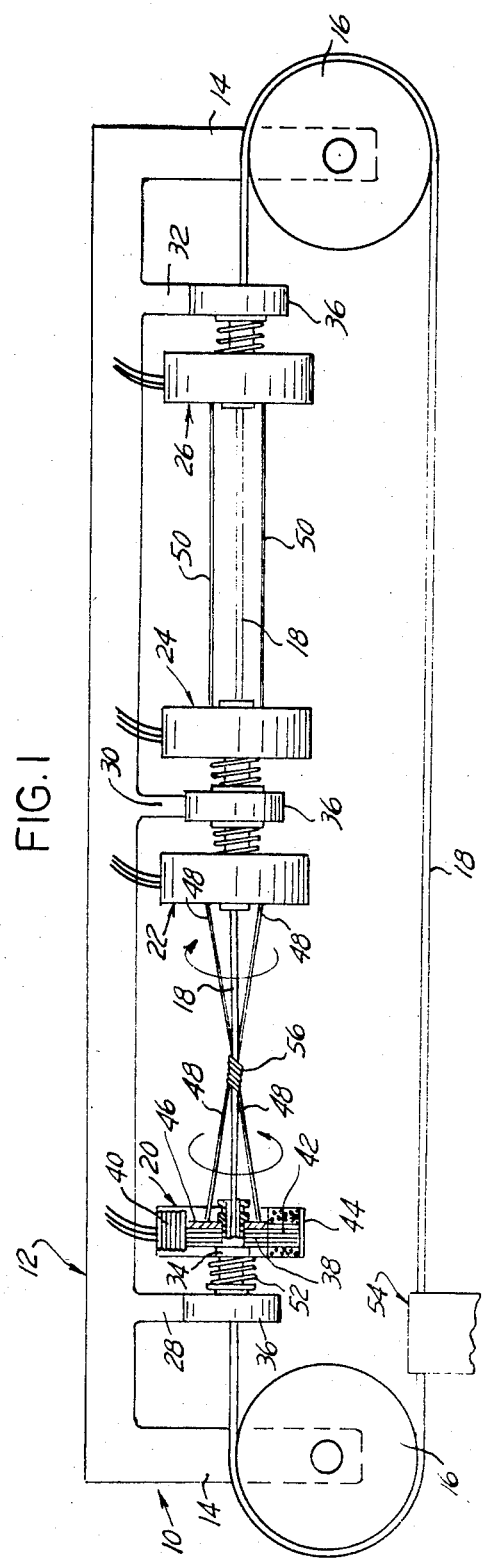
FIG. 1 is a schematic representation of a linear actuator according to the present invention.

Referring to the drawing in further detail, the linear actuator 10 of the invention comprises a frame 12 having an integral arm 14 at each end, each supporting a free roatating pulley 16. A cable 18 forming a continuous loop is wrapped around the pulleys 16 and its held taut therebetween. Four spaced apart electric motors 20, 22, 24 and 26, such as stepping motors, are mounted on the frame 12, being supported therefrom by arms 28, 30, and 32, respectively. Each motor 20, 22, 24 and 26 has a tubular shaft 34 affixed to the frame arms 28, 30 and 32 by an appropriate clamping bracket 36. Each electric motor 20-26 has an armature 38 rotatable relative to the tubular shaft 34. The armature 38 is disposed concentric within the appropriate excitation windings 40 of a stator 42 mounted in a housing 44. The housing 44 of each electric motor is fastened to the frame 12 by appropriate bracket means, not shown. Each armature 38 has an end plate 46 to which is attached the end of at least a pair of strands of flexible cables 48, the rotating armature end plate 46 of the motor 20 facing the rotating armature end plate, not shown, of the motor 22, and the other end of the strands 48 being attached to the rotating armature end plate of the motor 22. Similarly an array of strands 50, at least two in number, extends between the rotating armature end plates of the pair of motors 24 and 26, the rotating armature end plate of the motor 24 facing the rotating armature end plate of the motor 26. Preferably, any motion or vibration of the housing 44 of each motor is absorbed by means of a coil spring 52 disposed around each tubular shaft 34 and abutting at an end against the housing 44 and at the other end against the side of each support arm 36.

The cable 18 passes through the aligned tubular shafts 34 of the four motors 20, 22, 24 and 26, and it may be arranged to displace a load along its free portion between the pulleys 16, such load being arbitrarily represented at 54. The load 54 may be an operating device such as the slide of a machine tool, or any other member which is desired to be linearly displaced and positioned with accuracy.

Figure 2:
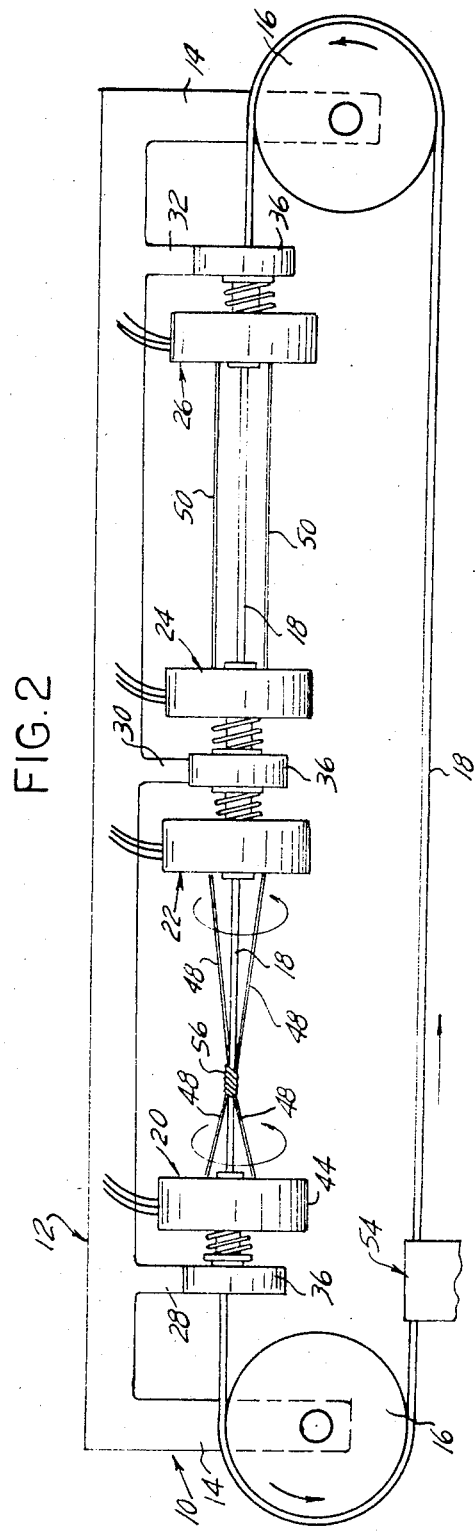

The length of looped cable 18 stretched between the pulleys 16 and passing through the motor tubular shafts 34 is linearly displaced as a result of wrapping and unwrapping the arrays of cable strands 48 and 50 around the periphery of the cable 18. This is accomplished by, for example, controllably energizing the motors 20 and 22 in opposite directions such that the cable strands 48 are twisted around the periphery of the cable 18, FIG. 1. This form a wrap 56 that establishes a grip upon the cable 18 which is proportional to the number of spirals, or turns, of the wrapped cable strands 48 coaxially in engagement with the periphery of the cable 18. Once such a grip on the cable 18 has been established, simultaneous rotation of the motors 20 and 22, FIG. 2, causes the wrapped cable strands 48 to wind tightly aroung the cable 18 at one end of the wrap 56, while unwinding at the other end of the wrap 56. For example, if the motors 20 and 22 are energized such as to cause the rotating armature end plates 46 of both motors to rotate in the same direction as shown by the arrows, FIG. 2, the wrapped cable strands 48 are being coiled or wound around the cable 18 between the wrap 56 and the motor 20, in a clockwise direction as viewed from the motor 20 location, while they are being unwound in a counter-clockwise direction from around the cable 18 between the motor 22 and the wrap 56, the motors 20 and 22 being energized to rotate their respective armatures in opposite directions at the same velocity. The cable 18 is therefore pulled toward the motor 20, FIG. 2, and is caused to advance toward the motor 20 thus, in turn, causing the pulleys 16 to rotate in the direction of the arrows and causing the load 54 to be displaced to the position indicated at FIG. 2.

Figure 3:
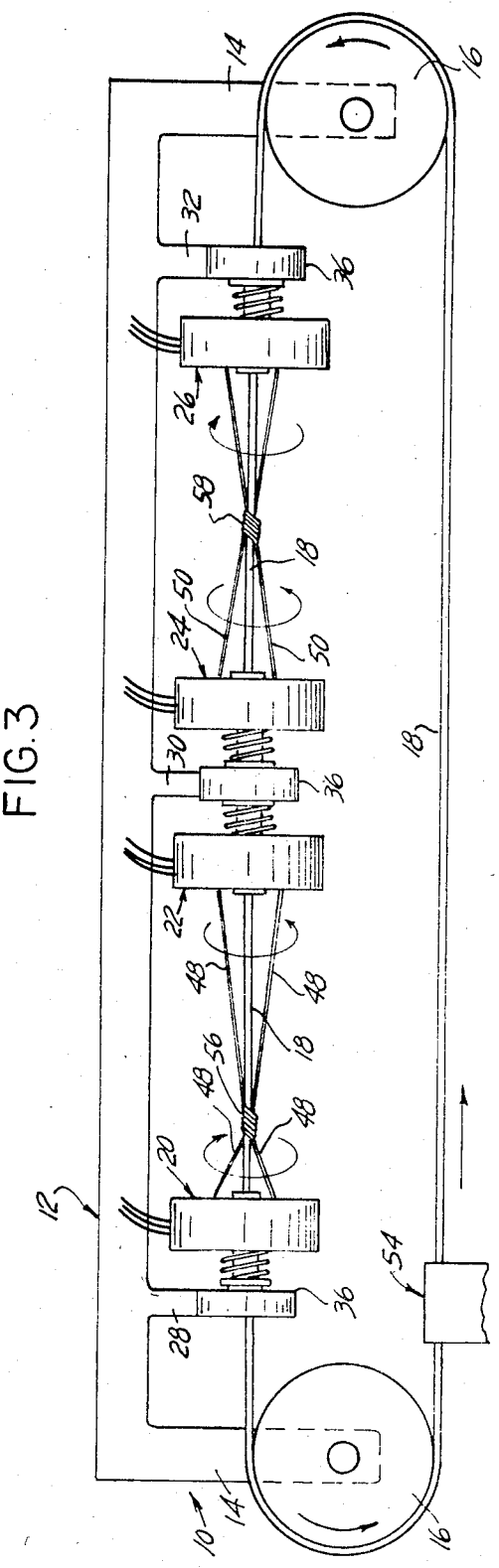
Figure 4:
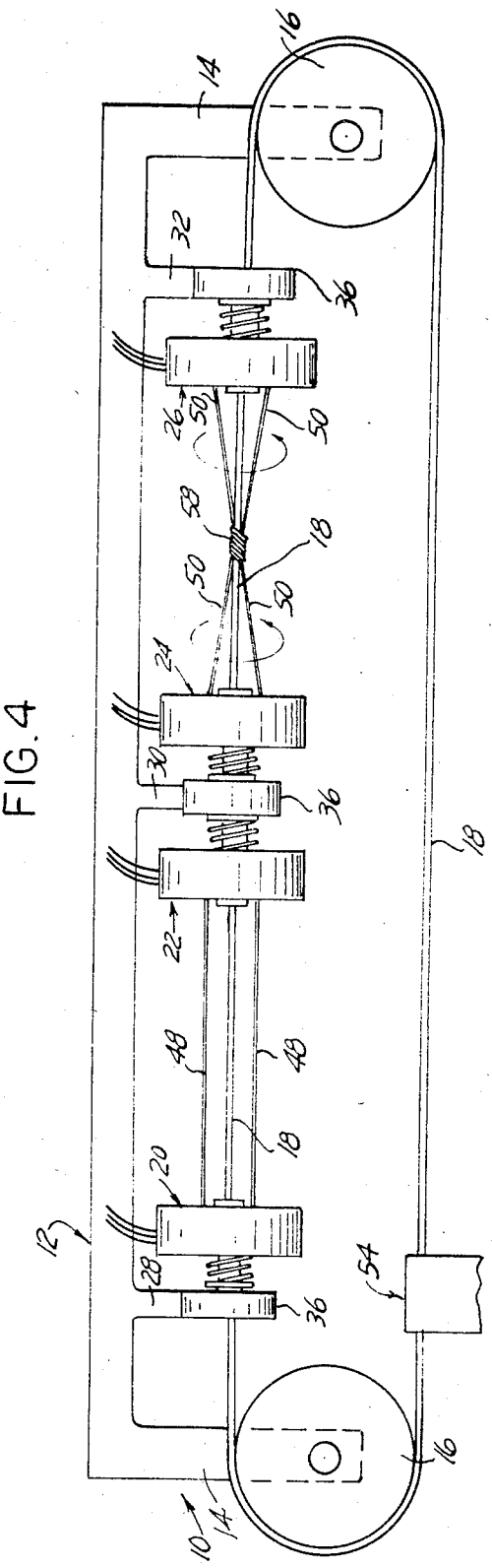
Figure 7:
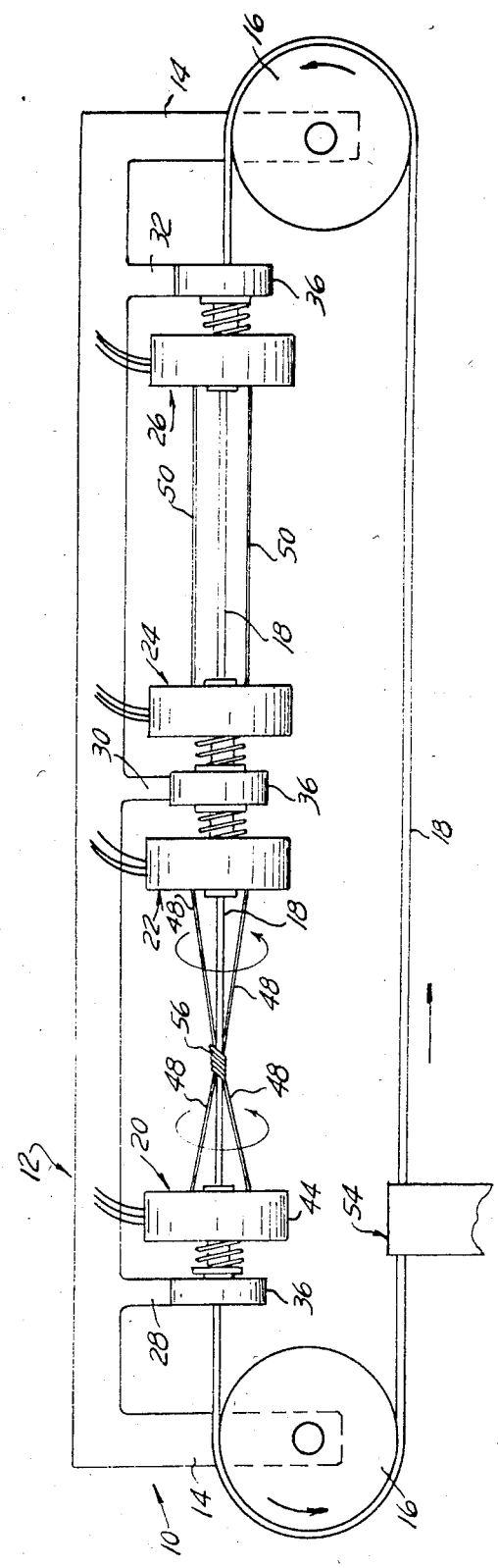

The motors 24 and 26, which until then have been de-energized such that their corresponding wrap cable strands 50 are disengaged from the cable 18, are energized such as to rotate in opposite directions for forming a wrap 58 over the cable 18, FIG. 3, thus establishing a grip on the cable 18 while the wrap 56 of the wrap cable strands 48 between the motors 20 and 22 is released by energizing the motors 20 and 22 to opposite rotations. After the wrap cable strands 48 have been completely released from engagement with the cable 18, FIG. 4, energizing the motors 24 and 26 in the same clockwise direction maintains the grip on the cable 18, and causes the wrap 58 on the cable 18 to be pulled and travel towards the motor 24, thus in turn pulling the cable 18 towards the motor 24 and causing the pulleys 16 to rotate and displace the load 54, FIG. 5. The motors 20 and 22 are then energized in opposite directions to establish a grip on the cable 18 by way of causing the wrap 56 to be re-established around the cable 18, while the motors 24 and 26 are energized in opposite directions to relese the grip wrap 58 from around the cable 18, FIG. 6. When the wrap 56, between the motors 20 and 22, is fully established on the cable 18, FIG. 7, energizing the motors 20 and 22 in the same direction, while the motors 24 and 26 are stopped, causes the cable 18 to be displaced further toward the motor 20, thus displacing the load 54.

It will be appreciated that, reversing the direction of simultaneous rotation of the pairs of motors 20–22 and 23–24 causes reversal of the direction of linear displacement of the cable 18 and that the velocity of rotation of the motors 20–26 may be modulated such as to cause displacement of the cable 18 at a constant speed, if so desired. It will be further appreciated that any grip strength can be established on the cable 18 by wrapping as many turns of the wrap cable strands 48–50 as desirable and that, by operating the pair of motors 24–26 simultaneously with the pair of motors 20–22 for advancing the cable 18, considerable force may be developed, for example for starting the motion of high inertia loads, after which alternate operation of the pairs of motors 20–22 and 24–26 may be selected for providing continuous motion of the cable 18 in an appropriate direction.

Reciprocating motion of the cable 18 is effected by establishing the grip wraps 56 and 58 in opposite directions and controlling the motors 24 and 26 to rotate simultaneously in the same direction, but opposite to the direction of simultaneous rotation of the motors 20 and 22.

It will also be appreciated that the output member may take a form other than the cable 18 and may consist, for example, of a solid rod.

Having thus described the present invention by way of an example of structure well designed to accomplish the purpose of the invention, modification whereof will be apparent to those skilled in the art, what is claimed as new is as follows:

1. A rotary to linear motion transformer comprising an elongate member, a plurality of flexible strands disposed around said elongate member each attached at an end to a first rotatable member and at the other end to a second rotatable member, means for rotating said first and second rotatable members in one direction and in opposite directions, whereby rotation of said first and second rotatable members in opposite direction causes said strands to wrap around said elongate member for effecting a grip on said elongate member, and whereby rotation of said rotatable member in the same direction linearly displaces said elongate member in the direction of wrap of said strands.

2. The rotary to linear motion transformer of claim 1 wherein said rotatable members are each the rotors of an electric motor, said strands extending from a rotor of one electric motor to the rotor of the other electric motor.

3. The rotary to linear motion transformer of claim 1 wherein said linear member is a flexible cable forming an endless loop, said loop being wound around a pair of pulleys disposed in a single plane and wherein said cable is disposed coaxially relative to said strands.

4. The rotary to linear motion transformer of claim 2 wherein said linear member is a flexible cable forming an endless loop, said loop being wound around a pair of pulleys disposed in a single plane and wherein said cable is disposed coaxially relative to said strands.

5. The rotary to linear motion transformer of claim 1 further comprising a second pair of rotatable members, said second pair of rotatable members being provided with a plurality of strands disposed coaxially around said elongate member and extending from one of said rotatable members to the other, said second plurality of strands being capable of effecting a grip on said elongate member simultaneously with the grip on said elongate member being released by the first plurality of strands.

6. The rotary to linear motion transformer of claim 2 further comprising a second pair of rotatable members, said second pair of rotatable members being provided with a plurality of strands disposed coaxially around said elongate member and extending from one of said rotatable members to the other, said second plurality of strands being capable of effecting a grip on said elongate member simultaneously with the grip on said elongate member being released by the first plurality of strands.

7. The rotary to linear motion transformer of claim 3 further comprising a second pair of rotatable members, said second pair of rotatable members being provided with a plurality of strands disposed coaxially around said elongate member and extending from one of said rotatable members to the other, said second plurality of strands being capable of effecting a grip on said elongate member simultaneously with the grip on said elongate member being released by the first plurality of strands.

8. The rotary to linear motion transformer of claim 4 further comprising a second pair of rotatable members, said second pair of rotatable members being provided with a plurality of strands disposed coaxially around said elongate member and extendin from one of said rotatable members to the other, said second plurality of strands being capable of effecting a grip on said elongate member simultaneously with the grip on said elongate member being released by the first plurality of strands.

9. A method for transforming rotary motion to linear motion comprising effecting a grip on a linearly displacable elongate member by means of a plurality of flexible strands having one end attached to a first input rotatable member and the other end attached to second input rotatable member, said strands being disposed coaxially around said linear output member, rotating said rotatable members in opposite directions for causing said strands to wrap around said linear output member for effecting a grip thereon, and rotating said rotatable members in the same direction for causing said grip to be linearly displaced in one direction corresponding to the direction of wrap of said strands around said linear output member.

10. The method of claim 9 further comprising disposing a second plurality of flexible strands around said linear output member, and effecting a grip on said linear output member in the same direction as and simultaneously with the grip of the first plurality of strands being released from said linear output member, whereby alternating the operation of said first and second pluralities of strands causes continuous linear motion of said linear output member in a single direction.

11. The method of claim 9 further comprising disposing a second plurality of flexible strands around said linear output member, and effecting a grip on said linear output member in an opposite direction to and simultaneously with the grip of the first plurality of strands being released from said linear output member, whereby alternating the operation of said first and second pluralities of strands caused linear motion of said linear output member in opposite directions.

* * * * *

UNITED STATES PATENT AND TRADEMARK OFFICE
CERTIFICATE OF CORRECTION

PATENT NO. : 4,593,571

DATED : June 10, 1986

INVENTOR(S) : John F. Schwarz

It is certified that error appears in the above-identified patent and that said Letters Patent is hereby corrected as shown below:

Col. 1, line 60, correct the spelling of "rotating".

Col. 1, line 61, change "its" to --is--.

Col. 2, line 44 correct the spelling of "around".

Col. 3, line 15, correct the spelling of "release".

Col. 4, line 47, correct the spelling of "extending".

Col. 6, line 7, change "caused" to --causes--.

Signed and Sealed this

Twenty-eighth Day of October, 1986

[SEAL]

*Attest:*

DONALD J. QUIGG

*Attesting Officer*      *Commissioner of Patents and Trademarks*